(12) United States Patent
Fife et al.

(10) Patent No.: US 6,864,147 B1
(45) Date of Patent: Mar. 8, 2005

(54) PROTECTIVE COATING FOR ELECTROLYTIC CAPACITORS

(75) Inventors: James A. Fife, Myrtle Beach, SC (US); Zebbie L. Sebald, Myrtle Beach, SC (US)

(73) Assignee: AVX Corporation, Myrtle Beach, SC (US)

(*) Notice: Subject to any disclaimer, the term of this patent is extended or adjusted under 35 U.S.C. 154(b) by 0 days.

(21) Appl. No.: 10/646,219

(22) Filed: Aug. 22, 2003

Related U.S. Application Data (62) Division of application No. 10/167,041, filed on Jun. 11, 2002, now Pat. No. 6,674,635.

(51) Int. Cl.⁷ .............................................. H01L 21/20
(52) U.S. Cl. ..................................... 438/399; 438/610
(58) Field of Search ................................ 438/399, 171, 438/393, 387, 425, 768, 763, 754

(56) References Cited

U.S. PATENT DOCUMENTS

| | | | |
|---|---|---|---|
| 1,413,145 A | 4/1922 | Weisberg | |
| 3,345,545 A | 10/1967 | Bourgault et al. | |
| 4,019,101 A | 4/1977 | Preissinger et al. | |
| 4,085,435 A | 4/1978 | Galvagni | |
| 4,168,520 A | 9/1979 | Coleman et al. | |
| 4,480,290 A | 10/1984 | Constanti et al. | |
| 4,580,189 A | 4/1986 | Dequasie et al. | |
| 4,609,971 A | 9/1986 | Shaffer | |
| 4,627,405 A | 12/1986 | Imhof et al. | |
| 4,639,836 A | 1/1987 | Crowley, Jr. | |

(List continued on next page.)

FOREIGN PATENT DOCUMENTS

| | | |
|---|---|---|
| EP | 0507315 | 10/1992 |
| EP | 0559109 | 9/1993 |
| EP | 0571329 | 11/1993 |
| GB | 1033020 | 6/1966 |
| JP | 6037114 | 2/1994 |

OTHER PUBLICATIONS

Abstract of Japanese Patent No. 01–253226.
Abstract of Japanese Patent No. 02–074016.
Abstract of Japanese Patent No. 02–074018.
Abstract of Japanese Patent No. 02–074021.
Abstract of Japanese Patent No. 02–153516.
Abstract of Japanese Patent No. 02–219211.
Abstract of Japanese Patent No. 02–235326.
Abstract of Japanese Patent No. 02–238613.
Abstract of Japanese Patent No. 02–249221.
Abstract of Japanese Patent No. 02–272717.

(List continued on next page.)

*Primary Examiner*—David Nelms
*Assistant Examiner*—Thinh T Nguyen
(74) *Attorney, Agent, or Firm*—Dority & Manning, P.A.

(57) ABSTRACT

A solid electrolytic capacitor that comprises an anode that contains a valve-action metal (e.g., tantalum, niobium, and the like) and a dielectric film overlying the anode is provided. The capacitor also comprises a protective coating overlying the dielectric film, wherein the protective coating contains a relatively insulative, resinous material. For example, in one embodiment, the resinous material can be a drying oil, such as olive oil, linseed oil, tung oil, castor oil, soybean oil, shellac, and derivatives thereof. The capacitor also comprises a conductive polymer coating overlying the protective coating. As a result of the present invention, it has been discovered that a capacitor can be formed that can have a relatively low leakage current, dissipation factor, and equivalents series resistance.

18 Claims, 1 Drawing Sheet

U.S. PATENT DOCUMENTS

| | | | |
|---|---|---|---|
| 4,729,058 A | 3/1988 | Gupta et al. | |
| 4,757,414 A | 7/1988 | Barker et al. | |
| 4,785,380 A | 11/1988 | Harakawa et al. | |
| 4,794,491 A | 12/1988 | Saiki | |
| 4,805,074 A | 2/1989 | Harakawa et al. | |
| 4,837,079 A | 6/1989 | Quantrille et al. | |
| 4,849,314 A | 7/1989 | Blanchet-Fincher et al. | |
| 4,864,472 A | 9/1989 | Yoshimura et al. | |
| 4,910,645 A | 3/1990 | Jonas et al. | |
| 4,934,033 A | 6/1990 | Harakawa et al. | |
| 4,945,452 A | 7/1990 | Sturmer et al. | |
| 4,984,134 A | 1/1991 | Locke | |
| 5,005,107 A | 4/1991 | Kobashi et al. | |
| 5,017,272 A | 5/1991 | Kamigawa | |
| 5,119,274 A | 6/1992 | Kinuta et al. | |
| 5,135,618 A | 8/1992 | Saiki et al. | |
| 5,187,650 A | 2/1993 | Kudoh et al. | |
| 5,198,968 A | 3/1993 | Galvagni | |
| 5,238,518 A | 8/1993 | Okubi et al. | |
| 5,320,725 A | 6/1994 | Gregg et al. | |
| 5,357,399 A | 10/1994 | Salisbury | |
| 5,394,295 A | 2/1995 | Galvagni et al. | |
| 5,424,907 A | 6/1995 | Kojima et al. | |
| 5,436,796 A | 7/1995 | Abe et al. | |
| 5,440,446 A | 8/1995 | Shaw et al. | |
| 5,457,862 A | 10/1995 | Sakata et al. | |
| 5,473,503 A | 12/1995 | Sakata et al. | |
| 5,495,386 A | 2/1996 | Kulkarni | |
| 5,586,000 A | 12/1996 | Sakata et al. | |
| 5,593,852 A | 1/1997 | Heller et al. | |
| 5,622,746 A | 4/1997 | Hahn et al. | |
| 5,710,011 A | 1/1998 | Forrow et al. | |
| 5,729,428 A | 3/1998 | Sakata et al. | |
| 5,798,905 A | 8/1998 | Nishiyama et al. | |
| 5,812,367 A | 9/1998 | Kudoh et al. | |
| 5,876,952 A | 3/1999 | Shieh | |
| 5,914,852 A | 6/1999 | Hatanaka et al. | |
| 5,938,797 A * | 8/1999 | Fujiwara et al. | 29/25.03 |
| 5,965,380 A | 10/1999 | Heller et al. | |
| 5,972,199 A | 10/1999 | Heller et al. | |
| 6,033,866 A | 3/2000 | Guo et al. | |
| 6,154,358 A | 11/2000 | Fukaumi et al. | |
| 6,162,611 A | 12/2000 | Heller et al. | |
| 6,192,252 B1 | 2/2001 | Lysejko et al. | |
| 6,197,252 B1 | 3/2001 | Bishop et al. | |
| 6,219,223 B1 | 4/2001 | Kobayashi et al. | |
| 6,241,863 B1 | 6/2001 | Monbouquette | |
| 6,284,478 B1 | 9/2001 | Heller et al. | |
| 6,299,757 B1 | 10/2001 | Feldman et al. | |
| 6,322,912 B1 | 11/2001 | Fife | |
| 6,322,963 B1 | 11/2001 | Bauer | |
| 6,324,051 B1 | 11/2001 | Igaki et al. | |
| 6,329,161 B1 | 12/2001 | Heller et al. | |
| 6,338,790 B1 | 1/2002 | Feldman et al. | |
| 6,340,597 B1 | 1/2002 | Svorc et al. | |
| 6,351,371 B1 | 2/2002 | Yoshida et al. | |
| 6,430,033 B1 | 8/2002 | Mitsui et al. | |

OTHER PUBLICATIONS

Abstract of Japanese Patent No. 02-298010.
Abstract of Japanese Patent No. 03-034303.
Abstract of Japanese Patent No. 03-046215.
Abstract of Japanese Patent No. 03-064013.
Abstract of Japanese Patent No. 03-072615.
Abstract of Japanese Patent No. 03-073509.
Abstract of Japanese Patent No. 03-078222.
Abstract of Japanese Patent No. 03-080522.
Abstract of Japanese Patent No. 03-093214.
Abstract of Japanese Patent No. 03-093216.
Abstract of Japanese Patent No. 03-093217.
Abstract of Japanese Patent No. 03-096210.
Abstract of Japanese Patent No. 03-167816.
Abstract of Japanese Patent No. 03-183111.
Abstract of Japanese Patent No. 03-261124.
Abstract of Japanese Patent No. 03-280519.
Abstract of Japanese Patent No. 03-280523.
Abstract of Japanese Patent No. 03-285321.
English Translation of Japanese Patent No. 04-023419.
Abstract of Japanese Patent No. 04-025009.
Abstract of Japanese Patent No. 04-034915.
Abstract of Japanese Patent No. 04-042912.
Abstract of Japanese Patent No. 04-044305.
Abstract of Japanese Patent No. 04-048710.
Abstract of Japanese Patent No. 04-053115.
Abstract of Japanese Patent No. 04-073924.
Abstract of Japanese Patent No. 04-111407.
Abstract of Japanese Patent No. 04-188814.
Abstract of Japanese Patent No. 04-206811.
Abstract of Japanese Patent No. 04-307915.
Abstract of Japanese Patent No. 04-307917.
Abstract of Japanese Patent No. 04-315412.
Abstract of Japanese Patent No. 04-315413.
Abstract of Japanese Patent No. 04-320318.
Abstract of Japanese Patent No. 05-047604.
Abstract of Japanese Patent No. 05-129160.
Abstract of Japanese Patent No. 05-136006.
Abstract of Japanese Patent No. 05-152169.
Abstract of Japanese Patent No. 05-159983.
Abstract of Japanese Patent No. 05-159987.
English Translation of Japanese Patent No. 05-217808.
Abstract of Japanese Patent No. 05-217809.
Abstract of Japanese Patent No. 05-234820.
Abstract of Japanese Patent No. 05-283291.
Abstract of Japanese Patent No. 06-077093.
Abstract of Japanese Patent No. 06-084708.
Abstract of Japanese Patent No. 06-112094.
Abstract of Japanese Patent No. 06-112095.
Abstract of Japanese Patent No. 06-112096.
Abstract of Japanese Patent No. 06-196116.
Abstract of Japanese Patent No. 52-079255.
"The Physical and Chemical Properties of Shellac," H.S. Cockeram and S.A. Levine, Journal of the Society of Cosmetic Chemists, May 12, 1961, pp. 316–323.
"Shape–Memory Alloys," Kirk Othmer Concise Encyclopedia of Chemical Technology, pp. 1052–1053.
"Application of Shellac in Polymers," Maiti and Rahman, pp. 442–445.
"The Heat Curing of Shellac," S. Ranganathan and R.W. Aldis, Bulletin No. 14, pp. 1–10.
"Tantalum Nitride: A New Substrate for Solid Electrolyte Cpacitors," Terrance B. Tripp, Richard M. Creasi, and Bonnie Cox, 20$^{th}$ Annual Meeting—Capacitor and Resistor Technology Symposium and Seminars.
"Comparisons of Multilayer Ceramic and Tantalum Capacitors," Jeffrey Cain, AVX Corporation.
"Basic Tantalum Capacitor Technology," John Gill, AVX Corporation.
"Glossary of Terms Used in the Tantalum Industry," John Gill, AVX Corporation.
"Analysis of Solid Tantalum Capacitor Leakage Current," R.W. Franklin, AVX Corporation.

* cited by examiner

FIG. 1

PROTECTIVE COATING FOR ELECTROLYTIC CAPACITORS

RELATED APPLICATIONS

The present application is a divisional of U.S. application Ser. No. 10/167,041 filed on Jun. 11, 2002, now U.S. Pat. No. 6,674,635.

BACKGROUND OF THE INVENTION

Electrolytic capacitors (e.g., tantalum capacitors) are increasingly being used in the design of circuits due to their volumetric efficiency, reliability, and process compatibility. For example, one type of capacitor that has been developed is a solid electrolytic capacitor that includes an anode (e.g., tantalum), a dielectric oxide film (e.g., tantalum pentoxide, $Ta_2O_5$) formed on the anode, a solid electrolyte layer (e.g., manganese dioxide, $MnO_2$), and a cathode. Various other layers can also be applied to the solid electrolyte layer, such as graphite and silver dispersion layers successively applied to the manganese oxide layer prior to welding the anode and cathode lead terminals onto the capacitor.

The solid electrolyte layer is generally designed to electrically connect the dielectric film and the cathode, and thus, must have a certain conductivity. In addition, the solid electrolyte layer is also designed to inhibit short-circuiting of the capacitor that results from the presence of defects in the dielectric film. For example, upon exposure to heat generated by a short-circuit current, a manganese oxide layer can be converted to an insulator and thereby inhibit further short-circuiting.

Nevertheless, despite the benefits of using manganese oxide as the solid electrolytic layer, other materials have also been utilized. For instance, some electrolytic capacitors have utilized a conductive polymer layer (e.g., polypyrrole, polythiophene, polyaniline, polyacetylene, poly-p-phenylene, and the like) as the electrolytic layer. Examples of such capacitors are described in U.S. Pat. Nos. 5,457,862 to Sakata, et al., 5,473,503 to Sakata, et al., 5,729,428 to Sakata, et al., and 5,812,367 to Kudoh, et al.

For instance, Sakata, et al. '862 describes forming a conductive polymer layer by polymerizing an aniline monomer on a dielectric oxide film using an oxidant. Sakata, et al. '862 states, however, that because such conductive layers are thin, they become damaged by thermal stress generated upon mounting the capacitor, thereby increasing leakage current. Thus, Sakata, et al. '862 also describes forming a first conductive polymer layer formed on the oxide layer and a second conductive polymer layer formed on the first conductive polymer layer.

Moreover, Sakata, et al. '428 describes a capacitor having an electron donor organic compound layer covering the dielectric oxide film and a conductive polymer layer as the solid electrolytic layer. Sakata, et al. '428 states that the electron donor layer can reduce normalized leakage current at higher temperatures when using a conductive polymer as the electrolytic layer. Examples of such electronic donor organic compounds are said to be fatty acids, aromatic carboxylic acids, anionic surface agents (carboxylate or sulfonate), phenol and derivatives thereof, silane coupling agents, titanium coupling agents, and aluminum coupling agents.

Nevertheless, despite the benefits obtained by utilizing a conductive polymer layer, various problems still remain with the capacitors formed therefrom. For instance, capacitors utilizing a conductive polymer layer still tend to short-circuit and have a relatively high equivalent series resistance ("ESR"), which refers to the extent that a capacitor acts like a resistor when charging and discharging in an electronic circuit.

As such, a need currently exists for an improved electrolytic capacitor that inhibits short-circuiting and has decreased ESR.

SUMMARY OF THE INVENTION

In accordance with one embodiment of the present invention, a solid electrolytic capacitor is disclosed that comprises an anode that contains a valve-action metal (e.g., tantalum, niobium, and the like) and a dielectric film overlying the anode. The capacitor also comprises a protective coating overlying the dielectric film, wherein the protective coating contains a relatively insulative, resinous material. In some embodiments, the resinous material is selected from the group consisting of polyurethane, polystyrene, esters of unsaturated or saturated fatty acids, and combinations thereof. For example, in one embodiment, the resinous material can be a drying oil, such as olive oil, linseed oil, tung oil, castor oil, soybean oil, shellac, and derivatives thereof.

The capacitor also comprises a conductive polymer coating overlying the protective coating. For example, in some embodiments, the conductive polymer is selected from the group consisting of polypyrroles, polythiophenes, polyanilines, polyacetylenes, poly-p-phenylenes, and derivatives thereof.

As a result of the present invention, it has been discovered that a capacitor can be formed that has a relatively low leakage current, dissipation factor, and equivalents-series resistance. For example, in some embodiments, the capacitor has a normalized leakage current of less than about 0.1 $\mu A/\mu F^*V$, in some embodiments less than about 0.01 $\mu A/\mu F^*V$, and in some embodiments, less than about 0.001 $\mu A/\mu F^*V$, where $\mu A$ is the measured leakage current of the capacitor in microamps and $\mu F^*V$ is the product of the capacitance and the rated voltage of the capacitor. In addition, the capacitor can also have a dissipation factor of less than about 10%, and in some embodiments, less than about 5%. Furthermore, the capacitor can have a equivalent series resistance of less than about 1000 milliohms, in some embodiments less than about 500 milliohms, and in some embodiments, less than about 100 milliohms.

In accordance with another embodiment of the present invention, a method for forming a solid electrolytic capacitor is disclosed that comprises forming an anode that contains a valve-action metal; anodizing a surface of the anode to form a dielectric film; forming a protective coating on the dielectric film, the protective coating containing a relatively insulative, resinous material; and forming a conductive polymer coating. In some embodiments, for example, the protective coating is formed from a solution containing the relatively insulative, resinous material. If desired, the solution may further contain a non-aqueous solvent. During formation, one or more layers of the protective coating may be dried. For example, in some embodiments, one or more layers of the protective coating are dried at a temperature of from about 50° C. to about 150° C.

In accordance with yet another embodiment of the present invention, a method for forming a solid electrolytic capacitor is disclosed that comprises forming an anode that contains a valve-action metal; anodizing a surface of the anode to form a dielectric film; applying a solution to the anodized anode that contains a conductive polymer catalyst and a relatively insulative, resinous material; and thereafter, applying a conductive monomer to the anodized anode, wherein the conductive monomer polymerizes to form a conductive polymer coating.

In accordance with another embodiment of the present invention, a method for forming a solid electrolytic capacitor is disclosed that comprises forming an anode that contains a valve-action metal; anodizing a surface of the anode to form a dielectric film; applying a solution to the anodized anode that contains a conductive monomer and a relatively insulative, resinous material; and thereafter, applying a conductive monomer catalyst to the anodized anode, wherein the conductive monomer polymerizes to form a conductive polymer coating.

Further, in accordance with still another embodiment of the present invention, a method for forming a solid electrolytic capacitor is disclosed that comprises forming an anode that contains a valve-action metal; anodizing a surface of the anode to form a dielectric film; applying a solution to the anodized anode that contains a conductive monomer, a conductive polymer catalyst, and a relatively insulative, resinous material, wherein the conductive monomer polymerizes to form a conductive polymer coating.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

The present invention is generally directed to an electrolytic capacitor that contains a protective coating formed in conjunction with a dielectric oxide film and a conductive polymer. In some embodiments, the protective coating contains a relatively insulative resinous material, such as esters of various fatty acids. It has been discovered that such a protective coating can inhibit the short-circuiting of the resulting capacitor and also reduce the equivalent series resistance ("ESR") of the capacitor.

Figure 1:
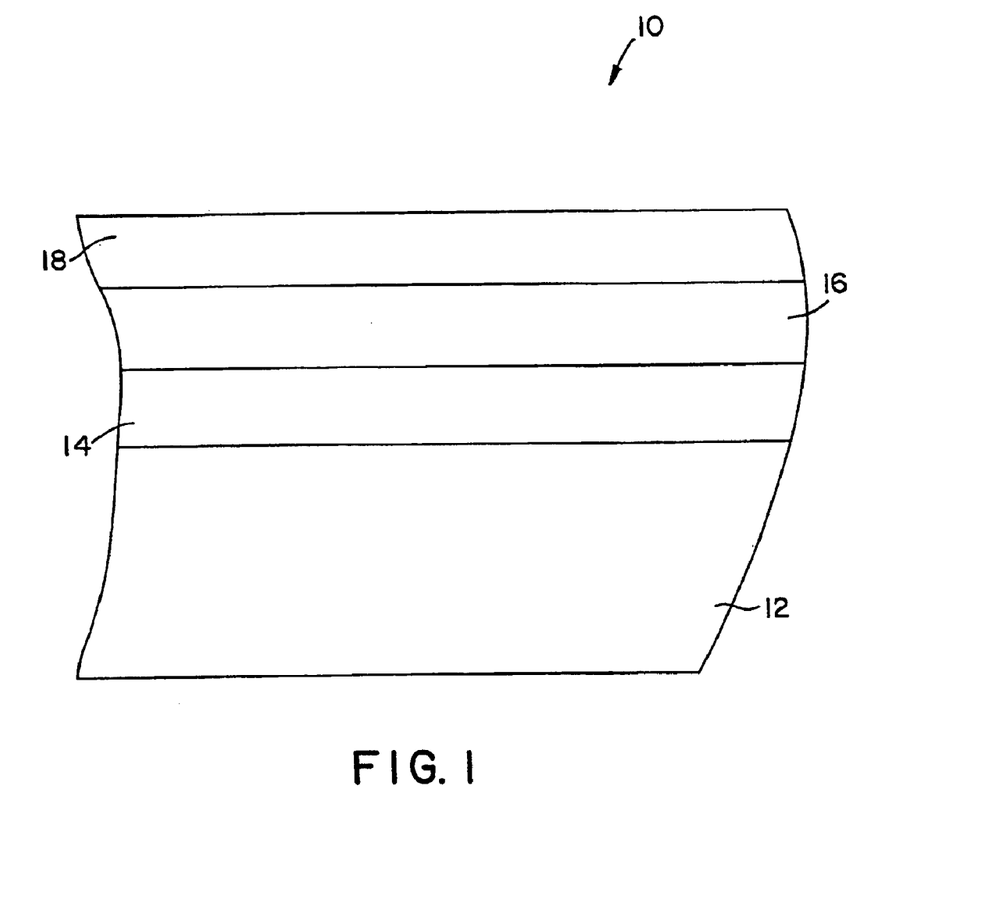
FIG. 1 is a cross-sectional view of one embodiment of a capacitor of the present invention.

Referring to FIG. 1, one particular embodiment of an electrolytic capacitor of the present invention will now be described in more detail. For example, a capacitor 10 is shown that includes an anode 12 that contains a valve metal. In general, any of a variety of valve metals may be utilized for forming the anode 12 of the capacitor 10. For instance, some suitable valve metals that may be utilized include, but are not limited to, tantalum, niobium, aluminum, hafnium, titanium, aluminum, alloys of these metals, and the like. The anode 12 may be formed primarily from the valve metal or from compositions that contain the valve metal as a component. For example, in some embodiments, the anode 12 can be formed from a valve metal oxide or nitride (e.g., niobium monoxide, tantalum oxide, tantalum nitride, niobium nitride, and the like) that is generally considered a semi-conductive or highly conductive material. Examples of such valve metal oxides are described in U.S. Pat. No. 6,322,912 to Fife, which is incorporated herein in its entirety by reference thereto for all purposes. Examples of such valve metal nitrides are described in "Tantalum Nitride: A New Substrate for Solid Electrolytic Capacitors" by T. Tripp; Proceedings of CARTS 2000: 20th Capacitor and Resistor Technology Symposium, 6–20 March 2000.

A variety of conventional fabricating procedures may generally be utilized to form the anode 12 from the selected metal. For instance, in one embodiment, a tantalum powder having a certain particle size is first selected. The particle size selected can vary depending on the voltage of the resulting capacitor desired. For example, powders with a relatively large particle size (e.g., about 10 micrometers) are often used to produce high voltage capacitors, while powders with a relatively small particle size (e.g., about 0.5 micrometers) are often used to produce low voltage capacitors.

Once the desired conductive metallic powder is selected, it is then typically mixed with a binder/lubricant to ensure that the particles adequately adhere to each other when pressed to form the anode. For example, in some embodiments, tantalum powder can be mixed with a small quantity (e.g., 5% by weight) of a stearic acid binder/lubricant.

In some embodiments, after being mixed with the binder/lubricant, the metallic powder is compressed around a metal wire or rod to form a "slug", which generally refers to the resulting anode element. For example, in one embodiment, tantalum powder can be compressed around a tantalum wire to form a tantalum slug. In this embodiment, the binder/lubricant is then removed by heating the slug under vacuum at a temperature of about 150° C. for several minutes. Alternatively, the binder/lubricant may also be removed by contacting the slug with an aqueous solution, such as described in U.S. Pat. No. 6,197,252 to Bishop, et al., which is incorporated herein in its entirety by reference thereto for all purposes.

Thereafter, the resulting slug is sintered to form a porous, integral mass. For example, in one embodiment, a slug formed from tantalum can be sintered at a temperature of between about 1500° C. to about 2000° C. under vacuum. In addition to the technique described above, any other technique for forming the anode 12 can also be utilized in accordance with the present invention. For example, other techniques for forming the anode 12 may also be described in U.S. Pat. Nos. 4,085,435 to Galvagni; 4,945,452 to Sturmer, et al.; 5,198,968 to Galvagni; 5,357,399 to Salisbury; 5,394,295 to Galvagni, et al.; and 5,495,386 to Kulkarni, which are incorporated herein in their entirety by reference thereto for all purposes.

After forming the anode 12, the dielectric film 14 is then formed. For example, in one embodiment, the anode 12 is anodized such that a dielectric film 14 is formed over and within the porous anode 12. Anodization is an electrical chemical process by which the anode metal is oxidized to form a material having a relatively high dielectric constant. For example, a tantalum anode can be anodized to form tantalum pentoxide ($Ta_2O_5$), which has a dielectric constant "k" of about 27. Specifically, in one embodiment, the tantalum slug is dipped into a weak acid solution (e.g., phosphoric acid) at an elevated temperature (e.g., about 85° C.) that is supplied with a controlled amount of voltage and current to form a tantalum pentoxide coating having a certain thickness. The power supply is initially kept at a constant current until the required formation voltage is reached. Thereafter, the power supply is kept at a constant voltage to ensure that the desired dielectric thickness is formed over the tantalum slug's surface. In addition to being formed on the surface of the tantalum slug, a portion of the dielectric oxide film will form on the surfaces of the pores of the metal. The following chemical equations generally describe one anodization process for tantalum:

$$\text{Anode: } 2Ta \rightarrow 2Ta^5 + 10e$$
$$2Ta^5 + 10OH^- \rightarrow Ta_2O_5 + 5H_2O$$
$$\text{Cathode: } 10H_2O + 10e \rightarrow 5H_2 + 10OH^-$$

However, it should be understood that the dielectric film 14 described above is but one example of a dielectric film that may be used in the present invention. In particular, the dielectric film may be formed from other types of materials and using different techniques ways. For example, if desired, a polymeric dielectric film, such as polyimide films, may be utilized. Examples of such films may be described in U.S. Pat. No. 5,812,367 to Kudoh, et al.

Once the dielectric film 14 is formed, a protective coating 16 is formed thereon. The protective coating 16 can generally include a variety of materials that are capable of forming a thin coating and that can improve the electrical performance of the resulting capacitor. Examples of suitable materials for the protective coating 16 include relatively insulative resinous materials (natural or synthetic). As used herein, the term "relatively insulative" means more resistive than the conductive polymer that primarily forms the conductive polymer coating 18 (described in more detail below). For example, in some embodiments, a "relatively insulative" resinous material can have a resistivity of greater than about 0.05 ohm-cm, in some embodiments greater than about 5, in some embodiments greater than about 1,000 ohm-cm, in some embodiments greater than about $1\times10^5$ ohm-cm, and in some embodiments, greater than about $1\times10^{10}$ ohm-cm. It is believed that the resistivity of shellac (described below), for instance, is $1.8\times10^{18}$ ohms-cm. Further, a "resin" or "resinous material" generally refers to a natural or synthetic, solid or semi-solid material that may have no definite melting point. Resinous materials are generally capable of being hardened or cured upon exposure to a curing agent, such as oxygen, heat, and the like.

Some resinous materials that can be utilized in the present invention include, but are not limited to, polyurethane, polystyrene, esters of unsaturated or saturated fatty acids (e.g., glycerides), and the like. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and the like. These esters of fatty acids have been found particularly useful when used in relatively complex combinations to form a "drying oil", which allows the resulting film to rapidly polymerize into a stable layer. Such drying oils may include mono-, di-, and/or triglycerides, which have a glycerol backbone with one, two, and three, respectively, fatty acyl residues that are esterified. For instance, some suitable drying oils that can be used include, but are not limited to, the following:

olive oil (is believed to contain esters of 84% oleic acid, 7% palmitic acid, 5% linoleic acid, and 2% stearic acid);

linseed oil (is believed to contain esters of 47% linolenic acid, 24% linoleic acid, 19% oleic acid, 6% palmitic acid, and 2% stearic acid);

tung oil (is believed to contain esters of 96% eleostearic acid and 4% oleic acid);

castor oil (is believed to contain esters of 87% ricinoleic acid, 7% oleic acid, 3% linoleic, 2% palmitic acid, and 1% stearic acid);

soybean oil (is believed to contain 26% oleic acid, 49% linoleic acid, 11% linolenic acid, and 14% of saturated acids); and shellac (is believed to contain esters of various aliphatic and alicyclic hydroxy acids, such as aleuritic acid and shellolic acid).

When utilized, the esters of fatty acids, such as described above, may exist naturally or be refined from natural materials. For example, soybean oil is often obtained from soybeans through refinement by solvent extraction with petroleum hydrocarbons or using continuous screw press operations. Upon extraction, the obtained soybean oil is primarily constituted of triglycerides of oleic acid, linoleic acid, and linolenic acid. Tung oil, on the other hand, is a drying oil that often requires no such refinement.

In some instances, it may be desired to initiate further esterification of a fatty acid mixture by reacting an alcohol therewith. Such fatty acid/alcohol ester derivatives may generally be obtained using any known alcohol capable of reacting with a fatty acid. For example, in some embodiments, monohydric and/or polyhydric alcohols with less than 8 carbon atoms, and in some embodiments, less than 5 carbon atoms, may be used in the present invention. Specific embodiments of the present invention include the use of methanol, ethanol, butanol, as well as various glycols, such as propylene glycol, hexylene glycol, and the like. In one particular embodiment, shellac can be esterified by mixing it with an alcohol, such as described above. Specifically, shellac is a resinous excretion of an insect that is believed to contain a complex mixture of fatty acids that, to some extent, are esterified. Thus, when mixed with an alcohol, the fatty acid groups of the shellac are further esterified by reaction with the alcohol.

The protective coating 16 can be applied in a variety of different ways. For example, in one embodiment, the anode part or slug can be dipped into a dipping solution of the desired protective coating material(s). The dipping solution can be formed by dissolving the selected protective coating material into a solvent, such as water or a non-aqueous solvent. Some suitable non-aqueous solvents can include, but are not limited to, methanol, ethanol, butanol, as well as various glycols, such as propylene glycol, hexylene glycol, di(ethylene acetate) glycol, and the like. Particularly desired non-aqueous solvents are those having a boiling point greater than about 80° C., in some embodiments greater than about 120° C., and in some embodiments, greater than about 150° C. As described above, the formation of a dipping solution using a non-aqueous solvent may also lead to further esterification of fatty acids when such resinous materials are utilized.

Once formed, the anode part can be dipped into the dipping solution one or more times, depending on the desired thickness of the protective coating 16. For example, in some embodiments, the number of protective layers that form the protective coating 16 can be from about 2 to about 10 layers, and in some embodiments, from about 3 to about 7 layers. Further, each protective layer can have a target thickness of less than about 100 Angstroms, in some embodiments, less than about 50 Angstroms, and in some embodiments, less than about 20 Angstroms. In one particular embodiment, the target thickness of each protective layer is about 10 Angstroms. Besides dipping, it should also be understood that other conventional application methods, such as sputtering, screen printing, electrophoretic coating, electron beam deposition, vacuum deposition, spraying, and the like, can also be used to deposit the protective coating 16.

After forming the protective coating 16, it is often desired that the anode part be heated or otherwise cured. Heating can facilitate evaporation of any solvent used during application, and may also aid in the esterification and/or polymerization of the resinous materials. To facilitate esterification and/or polymerization, curing agents may also be added to the protective coating 16. For instance, one example of a curing agent that can be used with shellac is sulfuric acid. The time and temperature at which heating occurs generally varies depending on the specific resinous materials utilized. Typically, each protective layer is dried at a temperature ranging from about 30° C. to about 300° C., and in some embodiments, from about 50° C. to about 150° C., for a time period ranging from about 1 minute to about 60 minutes, and in some embodiments, from about 15 minutes to about 30 minutes. It should also be understood that heating need not be utilized after application of each protective layer, but may instead be utilized only after formation of the entire protective coating 16.

Once the protective coating 16 is formed on the dielectric oxide film 14, such as described above, the conductive polymer coating 18 is then formed thereon. In particular, the conductive polymer coating 18 is generally formed from one or-more conductive polymers. For instance, suitable conductive polymers that can be utilized as the conductive polymer coating 18 include, but are not limited to, polypyrroles; polythiophenes, such as poly(3,4-ethylenedioxythiophene) (PEDT); polyanilines; polyacetylenes; poly-p-phenylenes; and derivatives thereof. Moreover, if desired, the conductive polymer coating 18 can also be formed from multiple conductive polymer layers. For example, in one embodiment, the conductive polymer coating 18 can contain one layer formed from PEDT and another layer formed from a polypyrrole.

Various methods can be utilized to apply the conductive polymer coating onto the anode part. For instance, conventional techniques such as sputtering, screen-printing, dipping, electrophoretic coating, electron beam deposition, spraying, and vacuum deposition, can be used to form the conductive polymer coating 18. In one embodiment, for example, the monomer(s) used to form the conductive polymer (e.g., PEDT), can initially be mixed with a polymerization catalyst to form a dispersion. For example, one suitable polymerization catalyst is BAYTRON C, which is iron III toluene-sulphonate and n-butanol and sold by Bayer Corporation. BAYTRON C is a commercially available catalyst for BAYTRON M, which is 3,4-ethylene dioxythiophene, a PEDT monomer also sold by Bayer Corporation.

Once a catalyst dispersion is formed, the anode part can then be dipped into the dispersion so that the polymer forms on the surface of the anode part. Alternatively, the catalyst and monomer(s) can also be applied separately to the anode part. In one embodiment, for example, the catalyst can be dissolved in a solvent (e.g., butanol) and then applied to the anode part as a dipping solution. The anode part can then be dried to remove the solvent therefrom. Thereafter, the anode part can be dipped into a solution containing the appropriate monomer. Once the monomer contacts the surface of the anode part containing the catalyst, it chemically polymerizes thereon.

In addition, in some embodiments, the catalyst (e.g., BAYTRON C) may also be mixed with the material(s) used to form the protective coating 16 (e.g., resinous materials). In such instances, the anode part can then be dipped into a solution containing the conductive monomer (BAYTRON M). As a result, the conductive monomer can contact the catalyst within and/or on the surface of the protective coating 16 and react therewith to form the conductive polymer coating 18. Although various methods have been described above, it should be understood that any other method for applying the conductive coating(s) to the anode part can also be utilized in the present invention. For example, other methods for applying such conductive polymer coating(s) may be described in U.S. Pat. Nos. 5,457,862 to Sakata, et al., 5,473,503 to Sakata, et al., 6,729,428 to Sakata, et al., and 5,812,367 to Kudoh, et al., which are incorporated herein in their entirety by reference thereto for all purposes.

In most embodiments, once applied, the conductive polymer is healed. Healing may occur after each application of a conductive polymer layer or may occur after the application of the entire conductive polymer coating. In some embodiments, for example, the conductive polymer can be healed by dipping the slug into an electrolyte solution, such as a solution of phosphoric acid and/or sulfuric acid, and thereafter applying a constant voltage to the solution until the current is reduced to a preselected level. If desired, such healing can be accomplished in multiple steps. For instance, in one embodiment, a slug having a conductive polymer coating is first dipped in phosphoric acid and applied with about 20 volts and then dipped in sulfuric acid and applied with about 2 volts. In this embodiment, the use of the second low voltage sulfuric acid solution or toluene sulphonic acid can help increase capacitance and reduce the dissipation factor (Df) of the resulting capacitor.

After application of some or all of the layers described above, the slug may then be washed if desired to remove various byproducts, excess catalysts, and the like. Further, in some instances, drying may be utilized after some or all of the dipping operations described above. For example, drying may be desired after applying the catalyst and/or after washing the slug in order to open the pores of the slug so that it can receive a liquid during subsequent dipping steps.

Once the conductive polymer coating is applied, the anode part may then be dipped into a graphite dispersion and dried. Further, the anode part may also be dipped into silver paste and dried. The silver coating can act as a solderable conductor for the capacitor and the graphite-coating can prevent the silver coating from directly contacting the conductive polymer coating(s). Lead electrodes may then be provided as is well known in the art.

Thus, as a result of the present invention, a capacitor may be formed that exhibits excellent electrical properties. For instance, it is believed that the protective coating of the present invention improves the mechanical stability of the interface between the conductive polymer and the dielectric film. This mechanically stable interface can result in a highly continuous and dense conductive polymer with high conductivity, thereby providing low equivalent series resistance (ESR). The equivalent series resistance of a capacitor generally refers to the extent that the capacitor acts like a resistor when charging and discharging in an electronic circuit and is usually expressed as a resistance in series with the capacitor. For example, a capacitor of the present invention typically has an ESR less than about 1000 milliohms (mohms), in some embodiments less than about 500 mohms, and in some embodiments, less than about 100 mohms.

In addition, after the anode is healed through the application of voltage, the resulting leakage current, which generally refers to the current flowing from one conductor to an adjacent conductor through an insulator, can be maintained at relatively low levels due to the mechanical stability of the interface provided by the protective coating. For example, the numerical value of the normalized leakage current of a capacitor of the present invention is, in some embodiments, less than about 0.1 $\mu A/\mu F^*V$, in some embodiments less than about 0.01 $\mu A/\mu F^*V$, and in some embodiments, less than about 0.001 $\mu A/\mu F^*V$, where $\mu A$ is microamps and $\mu F^*V$ is the product of the capacitance and the rated voltage.

It is also believed that the dissipation factor (Df) of the capacitor can also be maintained at relatively low levels. The dissipation factor (Df) generally refers to losses that occur in the capacitor and is usually expressed as a percentage of the ideal capacitor performance. For example, the dissipation factor of a capacitor of the present invention is typically less than about 10%, and in some embodiments, less than about 5%.

The present invention may be better understood by reference to the following examples.

Test Procedures

The leakage current, capacitance, dissipation factor, and equivalent series resistance of the capacitors were measured in the examples set forth below according to the following procedures.

The capacitance and dissipation factor were measured using an Agilent 4284A Precision LCR meter with Agilent 16089B Kelvin Leads with 2 volts bias and 1 volt signal at 120 Hertz. Equivalence series resistance was measured using an Agilent 4284A Precision LCR meter with Agilent 16089B Kelvin Leads with 2 volts bias and 1 volt signal at 100 kHertz.

Leakage current was measured using a MC 190. Leakage test set made by Mantracourt Electronics LTD, UK. The MC 190 test measures normalized leakage current at a temperature of 25° C. and at a certain rated voltage for 10 seconds. The "normalized leakage current" measurement has units of amps/(C*V), where C is the capacitance and V is the rated voltage of the capacitor. "Normalized leakage current" can be understood by analyzing the capacitor dielectric as though it were an ohmic resistor. For instance, Ohms Law is set forth below in equation (1):

$$\frac{V}{I} = R = \rho \cdot \frac{L}{A} \quad (1)$$

wherein,
V is the applied voltage,
I is the current flowing through the resistor,
R is the resistance (Ohms),
ρ is the inherent resistivity of the material,
L is the length the electric current must flow through the material,
and
A is the cross-section area of the material.

The leakage current flows from one "plate" of the capacitor (the anode) through the dielectric, to the other "plate" (the cathode). In this case, the conduction length, L, is the thickness of the dielectric layer and the cross-section area is the entire surface area of the anode.

The capacitance of any capacitor is given by the following equation (2):

$$C = \varepsilon \cdot \frac{A}{d} \quad (2)$$

wherein,
$\varepsilon$ is a constant of the dielectric,
A is the surface area of the anode, and
d is the distance between the two conducting plates of the capacitor.

In the case of an electrolytic capacitor, the thickness of the dielectric film (the distance between the plates) is proportional to the working voltage because the film is grown through electrochemical deposition of the film. The thickness of the resultant anodic oxide film is directly proportional to the voltage applied, and the voltage used is chosen to be proportional to the intended working voltage of the capacitor. Accordingly, the general capacitor equation for electrolytic capacitors can be modified as follows:

$$C = \varepsilon \cdot \frac{A}{\alpha \cdot V} \Rightarrow C \cdot V = \frac{\varepsilon}{\alpha} \cdot A$$

wherein, $\varepsilon$ and $\alpha$ are constants of the dielectric. Therefore, in the case of electrolytic capacitors, the product CV is proportional to the surface area of the anode.

Substituting CV for the area of the ohmic resistor in equation (1), and substituting $\alpha \cdot V$ for the length, L of the ohmic resistor yields the following equations (2) and (3):

$$\frac{V}{I} = R = \rho \cdot \frac{\alpha \cdot V}{C \cdot V} \quad (2)$$

$$\Rightarrow \frac{I}{C \cdot V} = \frac{1}{\alpha \cdot \rho} \quad (3)$$

As indicated in equation (3), the ratio of amps/C*V is proportional to the inverse of the intrinsic resistivity of the dielectric material. Therefore, this ratio, which is called the "normalized leakage current", gives a first order estimate of the inherent quality of the dielectric material in terms of its resistivity that permits comparisons between capacitors of different sizes and voltages.

Thus, in the examples below, the "normalized leakage current" was determined according to the following equation:

$$I_N = I_m/C^*V$$

wherein,
$I_N$=the normalized leakage current ($\mu A/\mu F^*V$),
$I_M$=the measured leakage current ($\mu A$),
C=the capacitance ($\mu F$), and
V=the rated voltage (V).

EXAMPLE 1

The ability of the protective coating of the present invention to form a tantalum capacitor with excellent electrical properties was demonstrated. In particular, eleven 100 $\mu F$/10 V anode parts were formed using the techniques described above. The first six anode parts (Nos. 1–6) were coated with three protective layers by being dipped three consecutive times into a solution of tung oil and di(ethylene glycol) ethyl ether acetate. Further, the remaining five anode parts (Nos. 7–11) were coated with three protective layers by being dipped three consecutive times into a solution of polyurethane and di(ethylene glycol) ethyl ether acetate.

After each individual dip in the protective layer solution, the samples were dried in an oven at 85° C. for 10 minutes and then at 125° C. for an additional 10 minutes. Upon formation of the entire protective coating, the samples were stored overnight to ensure that the protective layers were cured.

Thereafter, each sample was then coated with four layers of PEDT to form the conductive polymer coating. Specifically, each sample was first dipped into a solution containing BAYTRON C (catalyst obtained from Bayer) for thirty seconds. The samples were allowed to dry at room temperature for five minutes and then dipped into a solution of BAYTRON M (PEDT monomer obtained from Bayer) for thirty seconds. The samples were allowed to dry at room temperature for at least thirty minutes so that polymerization could occur. The samples were then washed in two methanol baths for ten minutes each. This procedure was repeated three times until four coats of PEDT were applied.

After each application of a PEDT layer, as described above, the part was also allowed to heal using two consecutive dipping steps. In particular, the part was first dipped into a 2% phosphoric acid ($H_3PO_4$) solution for one minute and a DMS 550 measurement and control interface (DI-AN micro systerns) was then used at 20 volts. Thereafter, the part was dipped into a 10% sulfuric acid ($H_2SO_4$) solution for one minute and an HP 4263A LCR meter was then used with a 2 volt bias and a 1 volt signal at 120 Hertz.

The samples were then terminated with Thermoset 6971 graphite and Thermoset K611-14 silver.

The results are shown below in Tables I-II.

TABLE I

Electrical Properties of the Samples Coated with Tung Oil

| Part # | Measured Dry Leakage Current ($\mu A$) | Normalized Dry Leakage Current ($\mu A/\mu F*V$) | Dry Capacitance ($\mu F$) | Dry Df, (%) | ESR (mohms) |
|---|---|---|---|---|---|
| 1 | 3.04 | 0.00310 | 96.48 | 1.77 | 79.1 |
| 2 | 1.41 | 0.00141 | 94.31 | 1.74 | 87.4 |
| 3 | 5.81 | 0.00590 | 98.29 | 2.08 | 100.5 |
| 4 | 0.54 | 0.00054 | 96.78 | 1.95 | 84.4 |
| 5 | 0.96 | 0.00098 | 98.35 | 2.66 | 125.2 |
| 6 | 0.62 | 0.00061 | 100.75 | 2.41 | 79.5 |
| Average | 2.06 | 0.00210 | 97.49 | 2.10 | 92.68 |

TABLE II

Electrical Properties of the Samples Coated with Polyurethane

| Part # | Measured Dry Leakage Current ($\mu A$) | Normalized Dry Leakage Current ($\mu A/\mu F*V$) | Dry Capacitance ($\mu F$) | Dry Df, (%) | ESR (mohms) |
|---|---|---|---|---|---|
| 7 | 1.62 | 0.00180 | 92.03 | 1.98 | 78.6 |
| 8 | 0.89 | 0.00093 | 96.05 | 1.93 | 79.7 |
| 9 | 2.27 | 0.00230 | 97.15 | 1.95 | 83.9 |
| 10 | 1.07 | 0.00120 | 88.02 | 1.97 | 91.9 |
| 11 | 1.36 | 0.0014 | 98.51 | 1.96 | 76.5 |
| Average | 1.44 | 0.00150 | 94.35 | 1.96 | 82.12 |

Thus, as indicated above, the samples formed with a protective coating of the present invention exhibited excellent electrical properties. For instance, as shown in Table I, the average normalized leakage current for the 100 $\mu F$/10 V samples made with tung oil was 0.0021 microamps/CV, while the average ESR for the 100 $\mu F$/10 V samples made with tung oil was 92.68 mohms.

EXAMPLE 2

The ability of the protective coating of the present invention to form a tantalum capacitor with excellent electrical properties was demonstrated. In particular, three sets of ten 1 $\mu F$/10V TAZA anode parts were obtained from the AVX factory in Biddeford, Me.

The anode parts Nos. 1–10 were coated with three protective layers by being dipped three consecutive times into a solution of 0.46 grams polyurethane and 40 milliliters di(ethylene glycol) ethyl ether acetate. The anode parts Nos. 11–20 were coated with three protective layers by being dipped three consecutive times into a solution of 0.46 grams of tung oil and 40 milliliters di(ethylene glycol) ethyl ether acetate. The anode parts Nos. 21–30 were coated with four protective layers by being dipped four consecutive times into a solution of 0.66 grams of shellac and 40 milliliters di(ethylene glycol) ethyl ether acetate.

After each individual dip in the protective layer solution, the samples were dried in an oven at 85° C. for 10 minutes and then at 125° C. for an additional 10 minutes. Upon formation of the entire protective coating, the samples were stored over two days to ensure that the protective layers were cured.

Thereafter, each sample was then coated with four layers of PEDT to form the conductive polymer coating. Specifically, each sample was first dipped into a solution containing BAYTRON C (catalyst obtained from Bayer) for thirty seconds. The samples were allowed to dry at room temperature for five minutes and then dipped into a solution of BAYTRON M (PEDT monomer obtained from Bayer) for thirty seconds. The samples were allowed to dry at room temperature for at least thirty minutes so that polymerization could occur. The samples were then washed in two methanol baths for ten minutes each. This procedure was repeated three times until four coats of PEDT were applied.

After each application of a PEDT layer, as described above, the part was also allowed to heal using two consecutive dipping steps. In particular, the part was first dipped into a 2% phosphoric acid ($H_3PO_4$) solution for one minute and a DMS 550 measurement and control interface (DI-AN micro systerns) was then used at 20 volts. Thereafter, the part was dipped into a 10% sulfuric acid ($H_2SO_4$) solution for one minute and an HP 4263A LCR meter was then used with a 2 volt bias and a 1 volt signal at 120 Hertz.

The samples were then terminated with Thermoset 6971 graphite and Thermoset K611-14 silver. The leakage current, capacitance, dissipation factor, and equivalent series resistance of the capacitors were measured as described in Example 1.

The median results for each sample are shown below in Table III.

TABLE III

Electrical Properties of the Samples Coated with Polyurethane, Tung Oil, and Shellac

| Part | Measured Dry Leakage Current ($\mu A$) | Normalized Dry Leakage Current ($\mu A/\mu F*V$) | Dry Capacitance ($\mu F$) | Dry Df, (%) | ESR (mohms) |
|---|---|---|---|---|---|
| Polyurethane | 0.01 | 0.0011 | 0.930 | 1.50 | 384 |
| Tung Oil | 0.01 | 0.0011 | 0.944 | 1.74 | 416 |
| Shellac | 0.006 | 0.0006 | 1.038 | 0.95 | 291 |

Thus, as indicated above, the samples formed with a protective coating of the present invention exhibited excellent electrical properties. For instance, as shown in Table III, the median normalized leakage current for the 1 μF/10V samples made with shellac was 0.0006 microamps/CV, while the median ESR for the 1 μF/10V samples made with shellac was 291 mohms.

EXAMPLE 3

The ability of the protective coating of the present invention to form a tantalum capacitor with excellent electrical properties was demonstrated. In particular, the procedure of Example 2 was repeated, except that the anode parts utilized were 4.7 pF/10V TAZA anode parts obtained from the AVX factory in Biddeford, Me. The median results for each sample are shown below in Table IV.

TABLE IV

Electrical Properties of the Samples Coated with Polyurethane, Tung Oil, and Shellac

| Part | Measured Dry Leakage Current (μA) | Normalized Dry Leakage Current (μA/μF*V) | Dry Capacitance (μF) | Dry Df, (%) | ESR (mohms) |
|---|---|---|---|---|---|
| Polyurethane | 2170.0 | 50.1 | 4.33 | 15.55 | 262.5 |
| Tung Oil | 0.05 | 0.0012 | 4.18 | 2.14 | 216.5 |
| Shellac | 0.08 | 0.0018 | 4.45 | 1.42 | 236.5 |

Thus, as indicated above, the samples formed with a protective coating of the present invention exhibited excellent electrical properties. For instance, as shown in Table IV, the median normalized leakage current for the 4.7 μF/10 V samples made with shellac was 0.0018 microamps/CV, while the median ESR for the 4.7 μF/10V samples made with shellac was 236.5 mohms.

EXAMPLE 4

The ability of the protective coating of the present invention to form a tantalum capacitor with excellent electrical properties was demonstrated. In particular, nine 10 μF/10V RAJA10K10G27 anode strips were obtained from the AVX factory at Lanskroun in the Czech Republic. Each strip was cut into two parts so that two sets of nine anodes were formed.

The anode parts of the first set were separated into nine sections (Nos. 1–9). The first section (No. 1) received no protective coating, the second section (No. 2) received one dip of a protective coating solution, the third section (No. 3) received two dips of a protective coating solution, etc., until the ninth section (No. 9) was coated with eight dips of a protective coating solution. The protective coating solution used to coat the section Nos. 1–9 contained 0.2 grams of linseed oil and 40 milliliters di(ethylene glycol) ethyl ether acetate.

The anode parts of the second set were also separated into nine sections (Nos. 10–18) and coated in the manner described above. The protective coating solution used to coat the section Nos. 10–18 contained 0.66 grams of shellac and 40 milliliters di(ethylene glycol) ethyl ether acetate.

After each individual dip in the protective layer solution, the samples were dried in an oven at 85° C. for 10 minutes and then at 125° C. for an additional 10 minutes. Upon formation of the entire protective coating, the samples were stored overnight to ensure that the protective layers were cured.

Thereafter, each sample was coated with four layers of PEDT to form the conductive polymer coating. Specifically, each sample was first dipped into a solution containing BAYTRON C (catalyst obtained from Bayer) for thirty seconds. The samples were allowed to dry at room temperature for five minutes and then dipped into a solution of BAYTRON M (PEDT monomer obtained from Bayer) for thirty seconds. The samples were allowed to dry at room temperature for at least thirty minutes so that polymerization could occur. The samples were then washed in two methanol baths for ten minutes each. This procedure was repeated three times until four coats of PEDT were applied.

After each application of a PEDT layer, as described above, the part was also allowed to heal using two consecutive dipping steps. In particular, the part was first dipped into a 2% phosphoric acid ($H_3PO_4$) solution for one minute and a DMS 550 measurement and control interface (DI-AN micro systems) was then used at 20 volts. Thereafter, the part was dipped into a 10% sulfuric acid ($H_2SO_4$) solution for one minute and an HP 4263A LCR meter was then used with a 2 volt bias and a 1 volt signal at 120 Hertz.

The samples were then terminated with Thermoset 6971 graphite and Thermoset K611-14 silver. The leakage current, capacitance, dissipation factor, and equivalent series resistance of the capacitors were measured as described in Example 1.

The results for each sample are shown below in Tables V–VI.

TABLE V

Electrical Properties of the Samples Coated with Linseed Oil

| Section # | # of Dips in Linseed Oil Solution | Measured Dry Leakage Current (μA) | Normalized Dry Leakage Current (μA/μF*V) | Dry Capacitance (μF) | Dry Df, (%) | ESR (mohms) |
|---|---|---|---|---|---|---|
| 1 | 0 | 0.39 | 0.00420 | 9.19 | 0.69 | 165 |
| 2 | 1 | 2188.4 | 11.7 | 18.71 | 104.6 | 135 |
| 3 | 2 | 0.09 | 0.00096 | 9.39 | 0.57 | 117 |
| 4 | 3 | 0.15 | 0.00170 | 8.73 | 0.91 | 177 |
| 5 | 4 | 2184.8 | 22 | 9.85 | 20.1 | 162 |
| 6 | 5 | 0.08 | 0.00090 | 8.92 | 1.31 | 228 |
| 7 | 6 | 2189.3 | 3.9 | 56.8 | 227.3 | 266 |
| 8 | 7 | 0.07 | 0.00075 | 9.31 | 1.84 | 292 |
| 9 | 8 | 0.14 | 0.00150 | 9.33 | 2.11 | 345 |

TABLE VI

Electrical Properties of the Samples Coated with Shellac

| Section # | # of Dips in Shellac Solution | Measured Dry Leakage Current (μA) | Normalized Dry Leakage Current (μA/μF*V) | Dry Capacitance (μF) | Dry Df, (%) | ESR (mohms) |
|---|---|---|---|---|---|---|
| 10 | 0 | 2187.9 | 7.7 | 28.39 | 144.9 | 134 |
| 11 | 1 | 2187.2 | 10.5 | 20.82 | 112.1 | 167 |
| 12 | 2 | 0.11 | 0.00120 | 9.21 | 0.77 | 194 |
| 13 | 3 | 0.22 | 0.00230 | 9.63 | 0.72 | 156 |
| 14 | 4 | 0.06 | 0.00064 | 9.36 | 0.88 | 156 |
| 15 | 5 | 0.07 | 0.00074 | 9.45 | 0.86 | 170 |
| 16 | 6 | 0.12 | 0.00130 | 9.35 | 0.96 | 171 |
| 17 | 7 | 0.06 | 0.00065 | 9.26 | 0.97 | 162 |
| 18 | 8 | 0.08 | 0.00085 | 9.39 | 1.26 | 195 |

Thus, as indicated above, the samples formed with a protective coating of the present invention exhibited excellent electrical properties. For instance, as shown in Tables V and VI, the parts having a protective coating generally had a much lower normalized leakage current than the parts without a protective coating.

EXAMPLE 5

The ability of the protective coating of the present invention to form a tantalum capacitor with excellent electrical properties was demonstrated. In particular, six 10 µF/10V RAJA10K10G27 anode parts were obtained from the AVX factory at Lanskroun in the Czech Republic.

The first anode part was not applied with any protective coating. As shown below in Tables VII–XII, the remaining anode parts were applied with dip solutions of citric acid, polystyrene and citric acid, polystyrene (0.20 grams polystyrene and 40 milliliters di(ethylene glycol) ethyl ether acetate), tung oil (0.46 grams tung oil and 40 milliliters di(ethylene glycol) ethyl ether acetate), and polyurethane (0.46 grams polyurethane and 40 milliliters di(ethylene glycol) ethyl ether acetate).

Each anode part was separated into seven sections such that the first section received no protective coating, the second section received one dip of the applicable solution, the third section received two dips of the applicable solution, etc., until the last section received six dips of the solution.

After each individual dip in the protective layer solution, the samples were dried in an oven at 85° C. for 10 minutes and then at 125° C. for an additional 10 minutes. Upon formation of the entire protective coating, the samples were stored overnight to ensure that the protective layers were cured.

Thereafter, each sample was then coated with four layers of PEDT to form the conductive polymer coating. Specifically, each sample was first dipped into a solution containing BAYTRON C (catalyst obtained from Bayer) for thirty seconds. The samples were allowed to dry at room temperature for five minutes and then dipped into a solution of BAYTRON M (PEDT monomer obtained from Bayer) for thirty seconds. The samples were allowed to dry at room temperature for at least thirty minutes so that polymerization could occur. The samples were then washed in two methanol baths for ten minutes each. This procedure was repeated three times until four coats of PEDT were applied.

After each application of a PEDT layer, as described above, the part was also allowed to heal using two consecutive dipping steps. In particular, the part was first dipped into a 2% phosphoric acid ($H_3PO_4$) solution for one minute and a DMS 550 measurement and control interface (DI-AN micro systems) was then used at 20 volts. Thereafter, the part was dipped into a 10% sulfuric acid ($H_2SO_4$) solution for one minute and an HP 4263A LCR meter was then used with a 2 volt bias and a 1 volt signal at 120 Hertz.

The samples were then terminated with Thermoset 6971 graphite and Thermoset K611-14 silver. The leakage current, capacitance, dissipation factor, and equivalent series resistance of the capacitors were measured as described in Example 1.

The results for each sample are shown below in Tables VII–XII.

TABLE VII

Electrical Properties of the Samples Without a Protective Coating

| Section # | # of Dips in Protective Coating Solution | Measured Leakage Current (µA) | Normalized Leakage Current (µA/µF*V) | Dry Capacitance (µF) | Dry Df, (%) | ESR (mohms) |
|---|---|---|---|---|---|---|
| 1 | 0 | Off scale | Off scale | 42.2 | 184.7 | 320.2 |
| 2 | 0 | Off scale | Off scale | 29.4 | 147.9 | 345.7 |
| 3 | 0 | 5.81 | 0.063 | 9.15 | 1.35 | 291.3 |
| 4 | 0 | Off scale | Off scale | 21.8 | 116.3 | 338.9 |
| 5 | 0 | Off scale | Off scale | 9.41 | 4.03 | 319.2 |
| 6 | 0 | Off scale | Off scale | 9.57 | 22.4 | 339.4 |
| 7 | 0 | Off scale | Off scale | 42.2 | 184.7 | 320.2 |

TABLE VIII

Electrical Properties of the Samples Applied with Citric Acid

| Section # | # of Dips in Citric Acid | Measured Leakage Current (µA) | Normalized Leakage Current (µA/µF*V) | Dry Capacitance (µF) | Dry Df, (%) | ESR (mohms) |
|---|---|---|---|---|---|---|
| 8 | 0 | Off scale | Off scale | 24.3 | 122.9 | 289 |
| 9 | 1 | Off scale | Off scale | 10.34 | 29.4 | 328 |
| 10 | 2 | 9.11 | 0.088 | 10.39 | 29.8 | 322 |
| 11 | 3 | 10.17 | 0.093 | 10.89 | 37.5 | 349 |
| 12 | 4 | Off scale | Off scale | 84.5 | 294.5 | 604 |
| 13 | 5 | Off scale | Off scale | 10.95 | 36.9 | 467 |
| 14 | 6 | 9.78 | 0.094 | 10.39 | 32.1 | 469 |

TABLE IX

Electrical Properties of the Samples Applied with Polystyrene and Citric Acid

| Section # | # of Dips in Polystyrene and Citric Acid Solution | Measured Leakage Current (µA) | Normalized Leakage Current (µA/µF*V) | Dry Capacitance (µF) | Dry Df, (%) | ESR (mohms) |
|---|---|---|---|---|---|---|
| 15 | 0 | Off scale | Off scale | 8.73 | 6.11 | 239 |
| 16 | 1 | Off scale | Off scale | 11.54 | 44.52 | 211 |
| 17 | 2 | Off scale | Off scale | 9.75 | 12.81 | 458 |
| 18 | 3 | 3.29 | 0.018 | 18.31 | 104.3 | 469 |
| 19 | 4 | Off scale | Off scale | 22.3 | 120.9 | 524 |
| 20 | 5 | Off scale | Off scale | 9.42 | 5.79 | 526 |
| 21 | 6 | Off scale | Off scale | 8.73 | 6.11 | 239 |

TABLE X

Electrical Properties of the Samples Applied with Polystyrene

| Section # | # of Dips in Polystyrene Solution | Measured Leakage Current (µA) | Normalized Leakage Current | Dry Capacitance (µF) | Dry Df, (%) | ESR (mohms) |
|---|---|---|---|---|---|---|
| 22 | 0 | 8.27 | 0.0880 | 9.42 | 0.81 | 270 |
| 23 | 1 | 0.91 | 0.0098 | 9.29 | 0.86 | 233 |
| 24 | 2 | 8.76 | 0.0930 | 9.42 | 0.82 | 193 |

TABLE X-continued

Electrical Properties of the Samples Applied with Polystyrene

| Section # | # of Dips in Polystyrene Solution | Measured Leakage Current ($\mu A$) | Normalized Leakage Current | Dry Capacitance ($\mu F$) | Dry Df, (%) | ESR (mohms) |
|---|---|---|---|---|---|---|
| 25 | 3 | 10.18 | 0.1050 | 9.69 | 0.89 | 233 |
| 26 | 4 | 1.43 | 0.0160 | 8.93 | 0.94 | 265 |
| 27 | 5 | 2.69 | 0.0280 | 9.56 | 0.98 | 309 |
| 28 | 6 | 1.71 | 0.0180 | 9.51 | 0.89 | 225 |

TABLE XI

Electrical Properties of the Samples Applied with Tung Oil

| Section # | # of Dips in Tung Oil Solution | Measured Leakage Current ($\mu A$) | Normalized Leakage Current ($\mu A/\mu F*V$) | Dry Capacitance ($\mu F$) | Dry Df, (%) | ESR (mohms) |
|---|---|---|---|---|---|---|
| 29 | 0 | 2.45 | 0.0260 | 9.55 | 0.87 | 250 |
| 30 | 1 | 0.13 | 0.0014 | 9.18 | 0.96 | 283 |
| 31 | 2 | 0.41 | 0.0045 | 9.18 | 0.93 | 312 |
| 32 | 3 | 0.12 | 0.0013 | 9.32 | 1.03 | 364 |
| 33 | 4 | 0.31 | 0.0034 | 9.02 | 0.82 | 403 |
| 34 | 5 | 0.25 | 0.0027 | 9.19 | 1.11 | 389 |
| 35 | 6 | 0.11 | 0.0012 | 9.45 | 1.08 | 405 |

TABLE XII

Electrical Properties of the Samples Applied with Polyurethane

| Section # | # of Dips in Polyurethane Solution | Measured Leakage Current ($\mu A$) | Normalized Leakage Current ($\mu A/\mu F*V$) | Dry Capacitance ($\mu F$) | Dry Df, (%) | ESR (mohms) |
|---|---|---|---|---|---|---|
| 36 | 0 | 32.4 | 0.3500 | 9.38 | 0.89 | 434 |
| 37 | 1 | 0.17 | 0.0018 | 9.42 | 0.94 | 278 |
| 38 | 2 | 0.21 | 0.0022 | 9.47 | 0.95 | 291 |
| 39 | 3 | 0.13 | 0.0014 | 9.58 | 0.93 | 250 |
| 40 | 4 | 0.71 | 0.0074 | 9.55 | 0.91 | 257 |
| 41 | 5 | 40.4 | 0.4400 | 9.08 | 0.81 | 324 |
| 42 | 6 | 1.25 | 0.0130 | 9.34 | 0.94 | 313 |

As shown, the parts having a protective coating of the present invention generally had a much lower normalized leakage current than the parts without a protective coating. Moreover, the anode parts formed with a protective coating containing a resinous material (e.g., polyurethane, shellac or tung oil) typically had better electrical performance than the anode part formed with only citric acid.

EXAMPLE 6

The ability of a protective coating of the present invention to form a tantalum capacitor with excellent electrical properties was demonstrated. In particular, 20 10 $\mu F$/4V anode parts were formed using the techniques described above. Each anode part was coated with 4 protective layers by being dipped 4 consecutive times into a solution of shellac and di(ethylene glycol) ethyl ether acetate. To form the shellac dipping solution, shellac was first obtained from Parks Corporation (Falls River, Mass.) in the form of an ethanol solution at a solids level of approximately 40%. Approximately 0.66 grams of the shellac solution is then dissolved into 40 milliliters of ethanol.

After each dip in the shellac solution, the parts were cured at 100° C. for 30 minutes. After the shellac protective coating was applied and cured, the anodes were dipped in a 10% $H_2SO_4$ solution for 10 minutes while applying 2 volts between the anode and the metal tray holding the acid. The excess $H_2SO_4$ was rinsed out with methanol, and the anodes were dried at 25° C.

Once the protective coating was formed, the anodes were then immersed into Baytron CB 40 (a catalyst obtained from the Bayer Corporation) that had been diluted to a solids content of 30% with n-butanol for 30 seconds and dried at 25° C. for 5–30 minutes. Thereafter, the anodes were dipped into Baytron M (a monomer obtained from Bayer Corporation) for 30 seconds and dried for 30 minutes at 25° C. in a relative humidity of 70 to 85%.

As a result, a conductive polymer layer of poly(3,4-ethylenedioxy thiophene) (PEDT) was formed. The conductive polymer layer was washed with methanol 3 to 5 times and then dried at 25° C. at a relative humidity of 70 to 85%. Further, each layer of PEDT was reformed in phosphoric acid at 2 times the rated voltage for 30 minutes, followed by washing in methanol and drying at 25° C. for 10 minutes at a relative humidity of 70 to 85%. The anodes were then immersed in a 10% sulfuric acid solution with 2 volts applied for 10 minutes, and thereafter washed in methanol and dried at 25° C. for 10 minutes at a relative humidity of 70 to 85%. The above-described procedure was repeated 11 more times to form 11 additional conductive polymer layers. After the final processing steps were completed, the anodes were coated with a graphite paste and dried at 100° C. for 10 minutes at less than 5% relative humidity. A silver paste coating was then formed on the carbon paste and dried at 85° C. for 30 minutes at less than 5% relative humidity.

The leakage current, capacitance, dissipation factor, and equivalent series resistance of the capacitors were measured as described in Example 1.

TABLE XIII

Electrical Properties of the Samples Coated with Shellac

| Part # | Measured Leakage Current ($\mu A$) | Normalized Leakage Current ($\mu A/\mu F*V$) | Dry Capacitance ($\mu F$) | Dry Df, (%) | ESR (mohms) |
|---|---|---|---|---|---|
| 1 | 0.35 | 0.00036 | 97.9 | 1.8 | 48.6 |
| 2 | 0.45 | 0.00046 | 98.3 | 1.8 | 49.7 |
| 3 | 0.37 | 0.00037 | 98.7 | 1.8 | 51.9 |
| 4 | 0.45 | 0.00046 | 98.1 | 1.7 | 50.6 |
| 5 | 0.63 | 0.00064 | 99.2 | 1.8 | 52.2 |
| 6 | 0.37 | 0.00038 | 98.4 | 1.9 | 59.7 |
| 7 | 0.54 | 0.00054 | 99.7 | 1.9 | 53.2 |
| 8 | 0.51 | 0.00051 | 99.6 | 1.8 | 51.8 |
| 9 | 0.42 | 0.00043 | 98.0 | 1.9 | 51.8 |
| 10 | 0.78 | 0.00080 | 97.6 | 1.6 | 53.2 |
| 11 | 1.49 | 0.00151 | 98.8 | 1.9 | 52.9 |
| 12 | 0.38 | 0.00039 | 97.6 | 1.9 | 52.1 |
| 13 | 0.37 | 0.00038 | 97.9 | 1.8 | 54.1 |
| 14 | 0.38 | 0.00038 | 98.8 | 1.7 | 52.9 |
| 15 | 0.37 | 0.00038 | 98.0 | 1.7 | 54.1 |
| 16 | 0.47 | 0.00048 | 98.4 | 1.7 | 52.7 |
| 17 | 0.38 | 0.00039 | 98.1 | 1.8 | 53.7 |
| 18 | 0.38 | 0.00039 | 98.4 | 1.7 | 52.6 |
| 19 | 0.41 | 0.00042 | 97.9 | 1.7 | 51.7 |
| 20 | 0.41 | 0.00042 | 97.2 | 1.7 | 50.3 |
| Avg. | 0.50 | 0.00050 | 98.33 | 1.77 | 52.50 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A method for forming a solid electrolytic capacitor, said method comprising:

forming an anode that contains a valve-action metal;

anodizing a surface of said anode to form a dielectric film;

forming a protective coating on said dielectric film, said protective coating containing a relatively insulative, resinous material; and forming a conductive polymer coating.

2. A method as defined in claim 1, wherein said resinous material contains esters of unsaturated or saturated fatty acids.

3. A method as defined in claim 1, wherein said resinous material contains at least one drying oil or derivatives thereof.

4. A method as defined in claim 3, wherein said drying oil is selected from the group consisting of olive oil, linseed oil, tung oil, castor oil, soybean oil, shellac, and derivatives thereof.

5. A method as defined in claim 1, wherein said protective coating contains shellac or derivatives thereof.

6. A method as defined in claim 1, wherein said protective coating is formed by from a solution containing said relatively insulative, resinous material.

7. A method as defined in claim 6, wherein said solution further contains a non-aqueous solvent having a boiling point greater than about 80° C.

8. A method as defined in claim 6, wherein said solution further contains a non-aqueous solvent having a boiling point greater than about 120° C.

9. A method as defined in claim 6, wherein said solution further contains a non-aqueous solvent having a boiling point greater than about 150° C.

10. A method as defined in claim 6, wherein said protective coating is formed by dipping said anode into said solution.

11. A method as defined in claim 1, further comprising applying a curing agent to the protective coating before forming said conductive polymer coating.

12. A method as defined in claim 10, wherein said curing agent contains sulfuric acid.

13. A method as defined in claim 1, wherein said protective coating includes multiple layers.

14. A method as defined in claim 13, wherein each protective coating layer is dried at a temperature ranging from about 30° C. to about 300° C.

15. A method as defined in claim 13, wherein each protective coating layer is dried at a temperature ranging from about 50° C. to about 150° C.

16. A method for forming a solid electrolytic capacitor, said method comprising:

forming an anode that contains a valve-action metal;

anodizing a surface of said anode to form a dielectric film;

applying a solution to said anodized anode that contains a conductive polymer catalyst and a relatively insulative, resinous material; and thereafter, applying a conductive monomer to said anodized anode, wherein said conductive monomer polymerizes to form a conductive polymer coating.

17. A method for forming a solid electrolytic capacitor, said method comprising:

forming an anode that contains a valve-action metal;

anodizing a surface of said anode to form a dielectric film;

applying a solution to said anodized anode that contains a conductive monomer and a relatively insulative, resinous material; and thereafter, applying a conductive monomer catalyst to said anodized anode, wherein said conductive monomer polymerizes to form a conductive polymer coating.

18. A method for forming a solid electrolytic capacitor, said method comprising:

forming an anode that contains a valve-action metal;

anodizing a surface of said anode to form a dielectric film;

applying a solution to said anodized anode that contains a conductive monomer, a catalyst for said conductive monomer, and a relatively insulative, resinous material, wherein said conductive monomer polymerizes to form a conductive polymer coating.

* * * * *

UNITED STATES PATENT AND TRADEMARK OFFICE
CERTIFICATE OF CORRECTION

PATENT NO.       : 6,864,147 B1
APPLICATION NO.  : 10/646219
DATED            : March 8, 2005
INVENTOR(S)      : James A. Fife and Zebbie L. Sebald It is certified that error appears in the above-identified patent and that said Letters Patent is hereby corrected as shown below:

Column 20, line 4, "A method as defined in claim 10, wherein said curingl" should be --A method as defined in claim 11, wherein said curing--

Signed and Sealed this

Twenty-seventh Day of March, 2007

JON W. DUDAS
*Director of the United States Patent and Trademark Office*